United States Patent [19]
Yoshino et al.

[11] Patent Number: 5,905,430
[45] Date of Patent: May 18, 1999

[54] TACTILE SENSOR DEVICE

[75] Inventors: Ryutaro Yoshino; Hideaki Takahashi, both of Wako, Japan

[73] Assignee: Honda Giken Kogyo Kabushiki Kaisha, Tokyo, Japan

[21] Appl. No.: 08/867,045

[22] Filed: Jun. 2, 1997

[30] Foreign Application Priority Data

Jun. 21, 1996 [JP] Japan .................................. 8-161402

[51] Int. Cl.$^6$ ...................................................... H04B 3/36
[52] U.S. Cl. .................... 340/407.1; 340/571; 340/686.5
[58] Field of Search ................................ 340/407.1, 571, 340/572.3, 573, 686.1, 687, 686.5

[56] References Cited

U.S. PATENT DOCUMENTS

4,667,182  5/1987  Murphy ................................ 340/407.1

*Primary Examiner*—Daniel J. Wu
*Assistant Examiner*—Daryl C. Pope
*Attorney, Agent, or Firm*—Nikaido, Marmelstein, Murray & Oram LLP

[57] ABSTRACT

A tactile sensor device for detecting a state of contact with a workpiece has a base body and a contact member spaced from the base body by a gap, for contacting the workpiece. The contact member is supported on the base body by a thin leaf spring for angular movement with respect to the base body and/or movement across the gap to cause a change in a distance between the contact member and the base body across the gap when the contact member is contacted by the workpiece. A gap sensor is mounted in the base body for generating a signal depending on the distance between the contact member and the base body across the gap at a predetermined region. A state of contact between the contact member and the workpiece can be detected on the basis of the distance across the gap as detected by the signal generated by the gap sensor.

10 Claims, 8 Drawing Sheets

TACTILE SENSOR DEVICE

BACKGROUND OF THE INVENTION

1. Field of the Invention

The present invention relates to a tactile sensor device for sensing contact of a contacting member, such as a finger of a robot hand, with an object.

2. Description of the Prior Art

Robot hands for gripping objects and holding them while they are being worked on have fingers equipped with tactile sensors for sensing the presence and absence of contact of the fingers with an object and the magnitude of the pressure on the fingers in order to adjust the grip force with which the fingers grip the object and also adjust the position of the robot hand with respect to the object.

One generally known tactile sensor comprises a strainable member attached to a robot hand finger for contacting an object and a strain gage mounted on the strainable member. The force of contact between the robot hand finger and the object is detected on the basis of an output signal from the strain gage.

However, the conventional tactile sensor is incapable of stably detecting the force of contact between the robot hand finger and the object under various environmental conditions because the strain gage are liable to suffer characteristic variations due to temperature changes and susceptible to noise.

Strain gages are relatively easily subject to wire disconnections when shocks are applied thereto, need skilled labor and time in order to be installed in place and thereafter processed for output adjustments, and are expensive to manufacture.

SUMMARY OF THE INVENTION

It is therefore an object of the present invention to provide a tactile sensor device which is relatively small and inexpensive and can sense contact of a contacting member, such as a finger of a robot hand, with an object.

To achieve the above object, there is provided in accordance with the present invention a tactile sensor device for detecting a state of contact with a workpiece, comprising a base body, a contact member spaced from the base body by a gap, for contacting the workpiece, a restorable resilient member, the contact member being supported on the base body by the restorable resilient member for angular movement with respect to the base body and/or movement across the gap to cause a change in a distance between the contact member and the base body across the gap when the contact member is contacted by the workpiece, and a gap sensor for generating a signal depending on the distance between the contact member and the base body across the gap at a predetermined region, whereby a state of contact between the contact member and the workpiece can be detected on the basis of the distance across the gap as detected by the signal generated by the gap sensor.

When the contact member contacts the workpiece, the contact member is angularly moved with respect to the base body or moved across the gap due to elastic deformation of the restorable resilient member, changing the distance between the contact member and the base body across the gap. The gap sensor now generates a signal depending on the distance between the contact member and the base body across the gap. Since the change in the distance across the gap depends on a state of contact between the workpiece and the contact member, it is possible to detect the state of contact between the workpiece and the contact member based on the signal from the gap sensor. According to the present invention, therefore, the state of contact between the workpiece and the contact member is converted into a physical quantity representing a change in the distance between the contact member and the base body across the gap, and the state of contact between the workpiece and the contact member is detected by detecting the distance with the gap sensor. The gap sensor for detecting the distance across the gap may comprise an eddy-current displacement sensor, a laser-beam displacement sensor, or an electrostatic capacitance displacement sensor, which is known in the art. These sensors are generally small in size and are not highly susceptible to temperature changes and noise. The restorable resilient member may comprises a leaf spring.

Therefore, the tactile sensor device is capable of stably detecting the state of contact between the contact member and the workpiece with a small-size, inexpensive structure which employs a gap sensor such as an eddy-current displacement sensor for measuring distances.

Specifically, the restorable resilient member comprises a thin leaf spring interposed between the base body and the contact member substantially perpendicularly to a direction across the gap, the thin leaf spring having a substantially central region fixed to either one of the contact member and the base body and an outer peripheral edge fixed to the other one of the contact member and the base body.

When the contact member and the workpiece contact each other, the thin leaf spring flexes, allowing the contact member to be angularly moved with respect to the base body and moved across the gap. The tactile sensor device is of a highly simple structure using the thin leaf spring.

The thin leaf spring preferably has a slot for assisting the thin leaf spring in being elastically deformable. The slot in the thin leaf spring permits the thin leaf spring to be elastically deformed easily when the workpiece contacts the contact member. Therefore, the distance across the gap can easily be changed, so that the state of contact between the contact member and the workpiece can be detected with high sensitivity.

Preferably, the restorable resilient member supports the contact body on the base body for angular movement with respect to the base body and movement across the gap and substantially against movement substantially perpendicularly to a direction across the gap and angular movement about an axis across the gap. The gap sensor may comprise at least three gap sensors for detecting distances between the base body and the contact member across the gap at at least three different regions. The tactile sensor device may further comprise force detecting means for detecting the magnitude and direction of a force acting on the contact member when the contact member is contacted by the workpiece, based on the distances across the gap at the different regions as detected by signals from the gap sensors.

For example, the gap sensor comprises three gap sensors, and the at least three different regions comprise three regions angularly spaced around the axis at equal angular intervals, the force detecting means comprising means for detecting the magnitude of a component of the force across the gap, the magnitude of a component of the force substantially perpendicularly to the direction across the gap, and a direction of the force substantially perpendicularly to the direction across the gap, based on the distances across the gap at the three regions as detected by signals from the three gap sensors.

In the case where the restorable resilient member supports the contact body on the base body for angular movement with respect to the base body and movement across the gap and substantially against movement substantially perpendicularly to a direction across the gap and angular movement about an axis across the gap, the gap sensor may comprise two gap sensors for detecting distances between the base body and the contact member across the gap at two different regions. The tactile sensor device may further comprise force detecting means for detecting a component in a predetermined direction of a force acting on the contact member when the contact member is contacted by the workpiece or a direction of the force, based on the distances across the gap at the two different regions as detected by signals from the two gap sensors.

For example, if the two regions are angularly spaced around the axis at a 180° interval, the force detecting means may comprise means for detecting the magnitude of the component of the force across the gap based on the distances across the gap at the two different regions as detected by signals from the two gap sensors.

Alternatively, if the two regions are angularly spaced around the axis at a 90° interval, the force detecting means may comprise means for detecting the direction of the force substantially perpendicular to the direction across the gap based on the distances across the gap at the two different regions as detected by signals from the two gap sensors.

In order that the restorable resilient member supports the contact body on the base body for angular movement with respect to the base body and movement across the gap and substantially against movement substantially perpendicularly to a direction across the gap and angular movement about an axis across the gap, the restorable resilient member may comprise the thin leaf spring.

Inasmuch as the distance across the gap changes when the contact member contacts the workpiece, the state of contact detected between the contact member and the workpiece on the basis of the distance across the gap as detected by the signal generated by the gap sensor may be indicative of whether the contact member is contacted by the workpiece or not.

The tactile sensor device preferably includes a cover covering the gap for preventing dust or dirt from entering the gap thereby to avoid a failure of the gap sensor to detect the distance across the gap.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
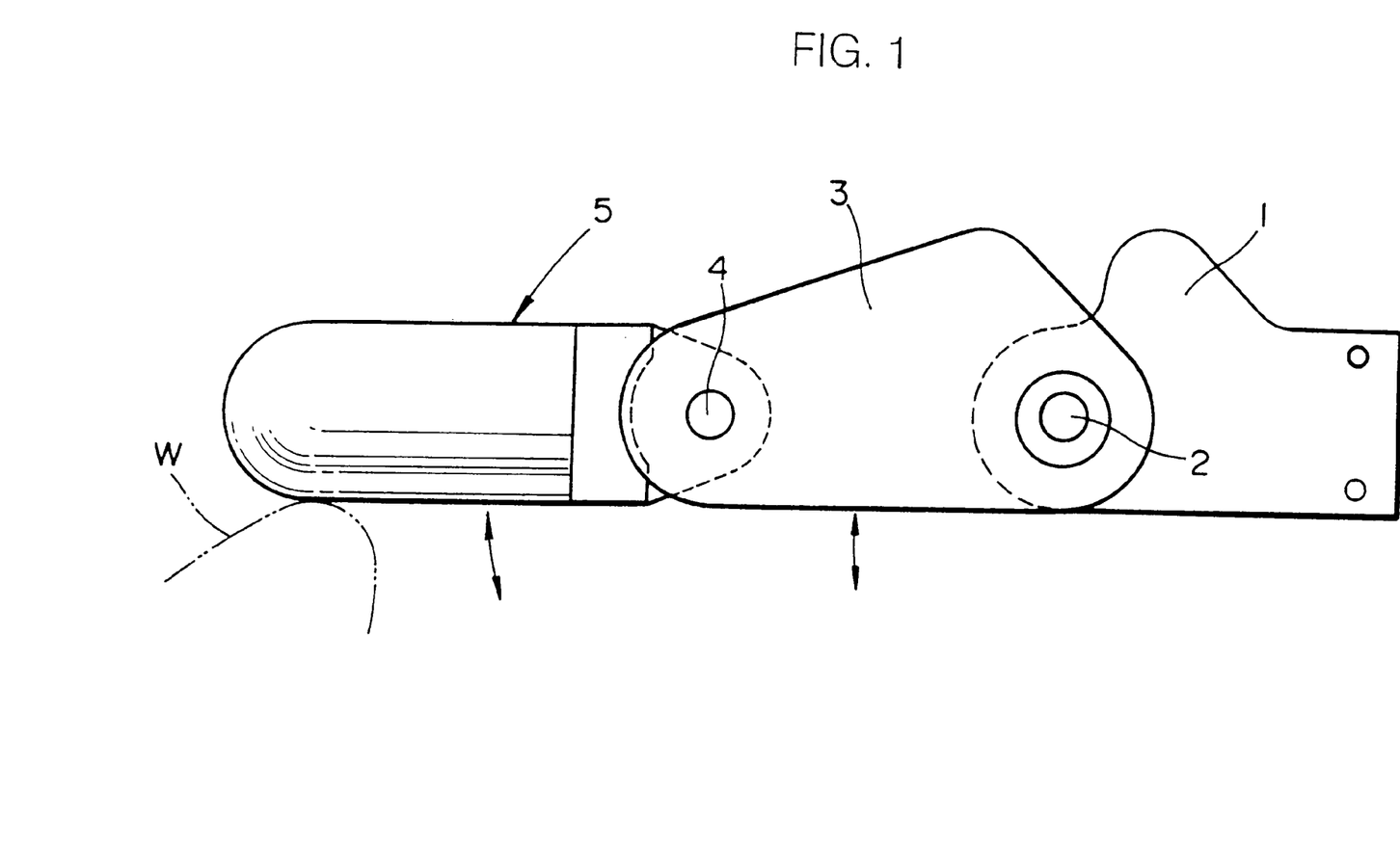
FIG. 1 is a side elevational view of a finger mechanism of a robot hand which incorporates therein a tactile sensor device according to an embodiment of the present invention.

FIG. 1 shows a finger mechanism of a robot hand which incorporates therein a tactile sensor device according to an embodiment of the present invention. As shown in FIG. 1, the finger mechanism comprises, as with a human finger, a proximal phalanx member 1 extending from the palm of a robot hand (not shown), a middle phalanx member 3 angularly movably coupled to and extending from the proximal phalanx member 1 through a first joint 2, and a distal phalanx member (finger tip) 5 angularly movably coupled to and extending from the middle phalanx member 3 through a second joint 4. A plurality of such finger mechanisms project from the palm of the robot hand. The phalanx members 3, 5 of each of the finger mechanisms are angularly movable about the first and second joints 2, 4 to grip an object or workpiece W with the tip ends of the distal phalanx members 5.

The tactile sensor device is incorporated in each of the distal phalanx members 5 for detecting the magnitude and direction of a force of contact between the tip end of the distal phalanx member 5 and the workpiece W.

Figure 2:
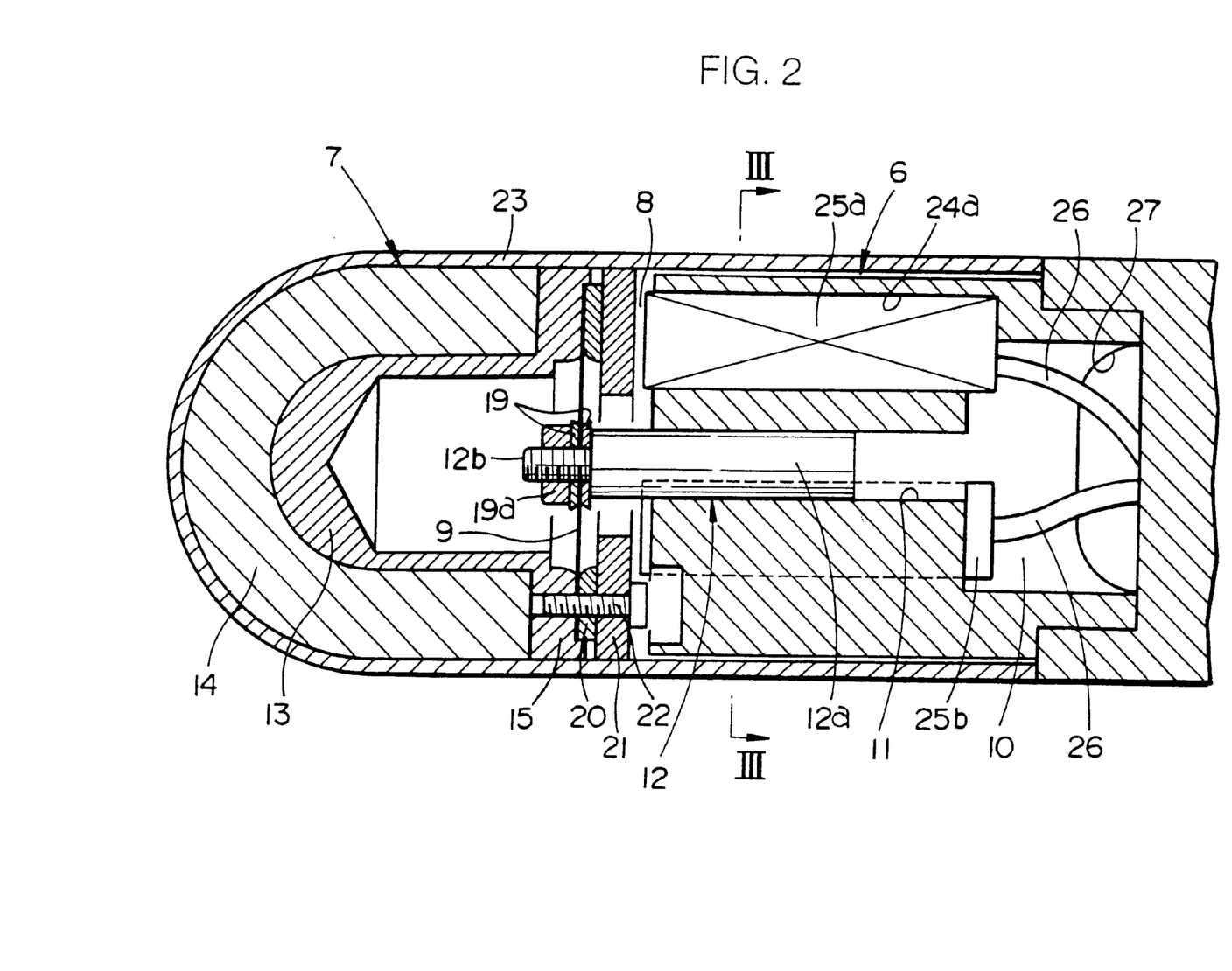
FIG. 2 is an enlarged fragmentary longitudinal cross-sectional view of the tactile sensor device incorporated in the finger mechanism shown in FIG. 1.

As shown in FIG. 2, the tactile sensor device comprises a base body 6 serving as a proximal portion of the distal phalanx member 5 near the middle phalanx member 3 and a contact member 7 serving as a distal portion of the distal phalanx member 5 for contacting the workpiece W. The base body 6 and the contact member 7 are spaced from each other by a gap 8 which accommodates therein a resilient thin leaf spring 9 by which the contact member 7 is supported on the base body 6.

The base body 6 is a substantially cylindrical shape and has a recess 10 defined in a rear end thereof near the middle phalanx member 3. The base body 6 also has an axial through hole 11 defined therein which extends from a distal end thereof close to the contact member 7 to the recess 10. A support rod 12 has a main portion 12a fixedly disposed in the through hole 11 and having a tip end projecting toward the contact member 7. The projecting tip end of the support rod 12 includes an externally threaded shank 12b which is coaxially with and smaller in diameter than the main portion 12a fixedly disposed in the through hole 11.

The contact member 7 comprises a bottomed cylindrical core 13 and an elastic body 14 disposed around the bottomed cylindrical core 13 and providing an outer surface. The elastic body 14 is made of an elastomeric material such as rubber, synthetic resin, or the like.

The core 13 has an inner open end opening toward the base body 6 and is held in coaxial alignment with the base body 6. The core 13 includes an annular flange 15 disposed around the inner open end thereof and extending radially outwardly. The core 13 has a spherically round outer end surface (bottom surface) which is covered with the elastic body 14.

The elastic body 14 is fixedly mounted on the outer surface of the core 13 so as to cover the core 13 in its entirety except for the annular flange 15. The elastic body 14 has its tip end spherically shaped complementarily to the spherically round outer end surface of the core 13.

Figure 4:
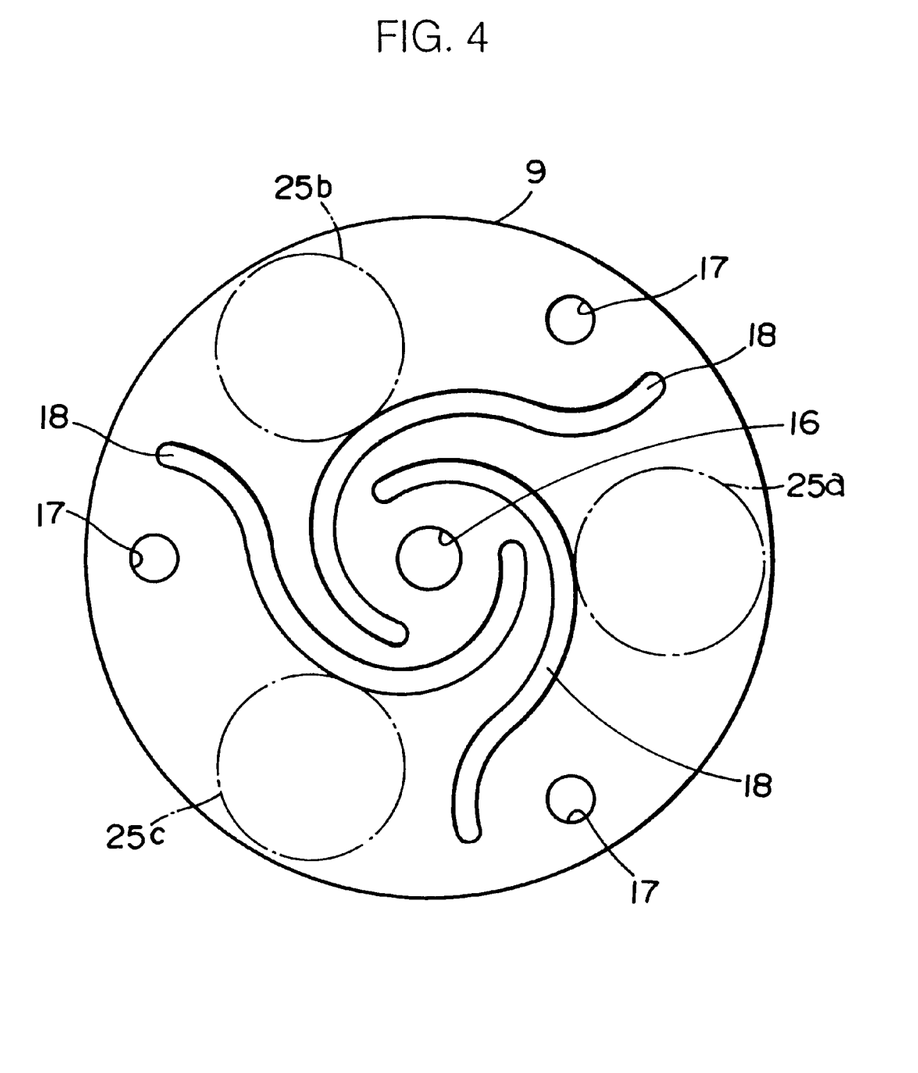
FIG. 4 is a plan view of a thin leaf spring in the tactile sensor device incorporated in the finger mechanism shown in FIG. 1.

As shown in FIG. 4, the thin leaf spring 9 is made of metal and has a circular shape and a thickness ranging from 0.2 mm to 2 mm, for example.

The thin leaf spring 9 has a central hole 16 defined in a central region thereof for insertion therethrough of the externally threaded shank 12b to support the thin leaf spring 9 on the externally threaded shank 12b. The thin leaf spring 9 also has a plurality of (three in this embodiment) holes 17 defined therein along an outer circumferential edge thereof. The thin leaf spring 9 is fastened to the annular flange 15 by screws 22 (one shown in FIG. 2) threaded through the holes 17 into the annular flange 15. The thin leaf spring 9 further has a plurality of (three in this embodiment) tortuous slots 18 defined therein in generally radial directions for making the thin leaf spring 9 easily elastically deformable. The slots 18 may be dispensed with if the thin leaf spring 9 is thin enough to be easily elastically deformable of its own accord.

As shown in FIG. 2, the thin leaf spring 9 with its central region sandwiched by a pair of washers 19 is fitted over the externally threaded shank 12b of the support rod 12 which extends through the central hole 16 and the washers 19. A nut 19a is then threaded over the externally threaded shank 12b from its tip end toward the main portion 12a to fasten the central region of the thin leaf spring 9 through the support rod 12 to the base body 6. The washers 19 have respective outer circumferential edges tapered from ends thereof held out of contact with the thin leaf spring 9 toward ends thereof held in contact with the thin leaf spring 9, for thereby preventing the thin leaf spring 9 from being broken or damaged under stresses concentrated on the region thereof held in contact with the washers 19 when the thin leaf spring 9 is elastically deformed.

The outer circumferential edge of the thin leaf spring 9 is clamped between the annular flange 15 of the core 13 and a washer 20 which has substantially the same diameter as the annular flange 15. An annular conductive plate 21 which has substantially the same diameter as the washer 20 is held against a rear surface of the washer 20 remote from the thin leaf spring 9. Screws 22 are threaded through the annular conductive plate 21, the washer 20, and the holes 17 in the thin leaf spring 9 into the annular flange 15 for thereby fastening the outer circumferential edge of the thin leaf spring 9, together with the washer 20 and the conductive plate 21, to the core 13. The annular flange 20 and the conductive plate 21 have respective inner circumferential edges tapered to prevent stresses from being concentrated on their regions held in contact with the thin leaf spring 9.

In the above assembled structure of the base body 6, the contact member 7, and the thin leaf spring 9, the contact member 7 with the annular flange 20 and the conductive plate 21 mounted thereon is supported on the base body 6 through the thin leaf spring 9 with the gap 8 left between the conductive plate 21 and the tip end of the base body 6. When the thin leaf spring 9 is elastically deformed or flexed, the contact member 7 is swingable about the center of the thin leaf spring 9 fixed to the support rod 12, and is also axially movable across the gap 8. The thin leaf spring 9 is highly rigid against sliding movement of the contact member 7 perpendicular to the axis of the base body 6 and also against rotation of the contact member 7 about the axis of the base body 6. Therefore, the contact member 7 is almost immovable in those directions, i.e., the direction perpendicular to the axis of the base body 6 and the direction about the axis of the base body 6. The amount of swinging movement of the contact member 7 upon contact with the workpiece W is sufficiently small compared with the size of the contact member 7.

The outer surface of the contact member 7 is covered in its entirety with a flexible cover 23 of rubber, leather, or the like. The flexible cover 23 has an end portion covering the gap 8 and the outer circumferential surface of the base body 6 for preventing dust particles from entering the gap 8. The flexible cover 23 may be fixed to the base body 6.

Figure 3:
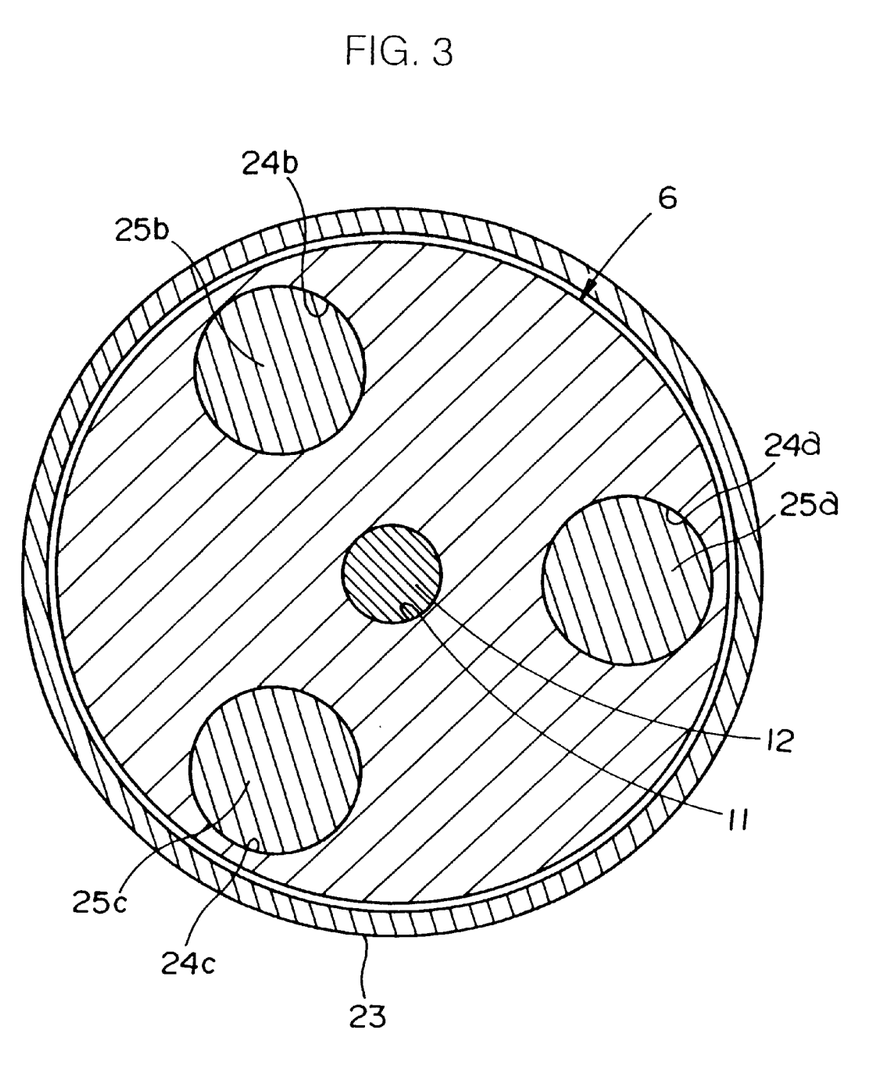
FIG. 3 is a transverse cross-sectional view taken along line III—III of FIG. 2.

As shown in FIGS. 2 and 3, the base body 6 has three sensor insertion holes 24a, 24b, 24c, for example, defined therein at respective regions confronting the annular conductive plate 21. The sensor insertion holes 24a, 24b, 24c are angularly spaced at equal angular intervals (120° intervals) around the axial through hole 11, and axially extend parallel to the axial through hole 11 from the tip end of the base body 6 toward the recess 11. Gap sensors 25a, 25b, 25c for detecting distances between the conductive plate 21 and the tip ends of the gap sensors 25a, 25b, 25c across the gap 8 are inserted and fixed in the respective sensor insertion holes 24a, 24b, 24c. The gap sensors 25a, 25b, 25c are angularly spaced from the screws 22 in the holes 17 in the circumferential direction of the thin leaf sprig 9, as shown in FIG. 4.

The gap sensors 25a, 25b, 25c are of the known eddy-current type for generating eddy currents in those regions of the conductive plate 21 which face the respective gap sensors 25a, 25b, 25c and simultaneously producing signals representative of distances between the conductive plate 21 and the tip ends of the gap sensors 25a, 25b, 25c across the gap 8.

The gap sensors 25a, 25b, 25c have respective rear ends partly exposed in the recess 10. Leads 26 for carrying signals from the gap sensors 25a, 25b, 25c are electrically connected to the exposed ends of the gap sensors 25a, 25b, 25c and extend in the recess 10. The base body 6 has a hole 27 defined in a lateral wall thereof in communication with the recess 10, and the leads 26 extend out of the base body 6 through the hole 27.

Figure 5:
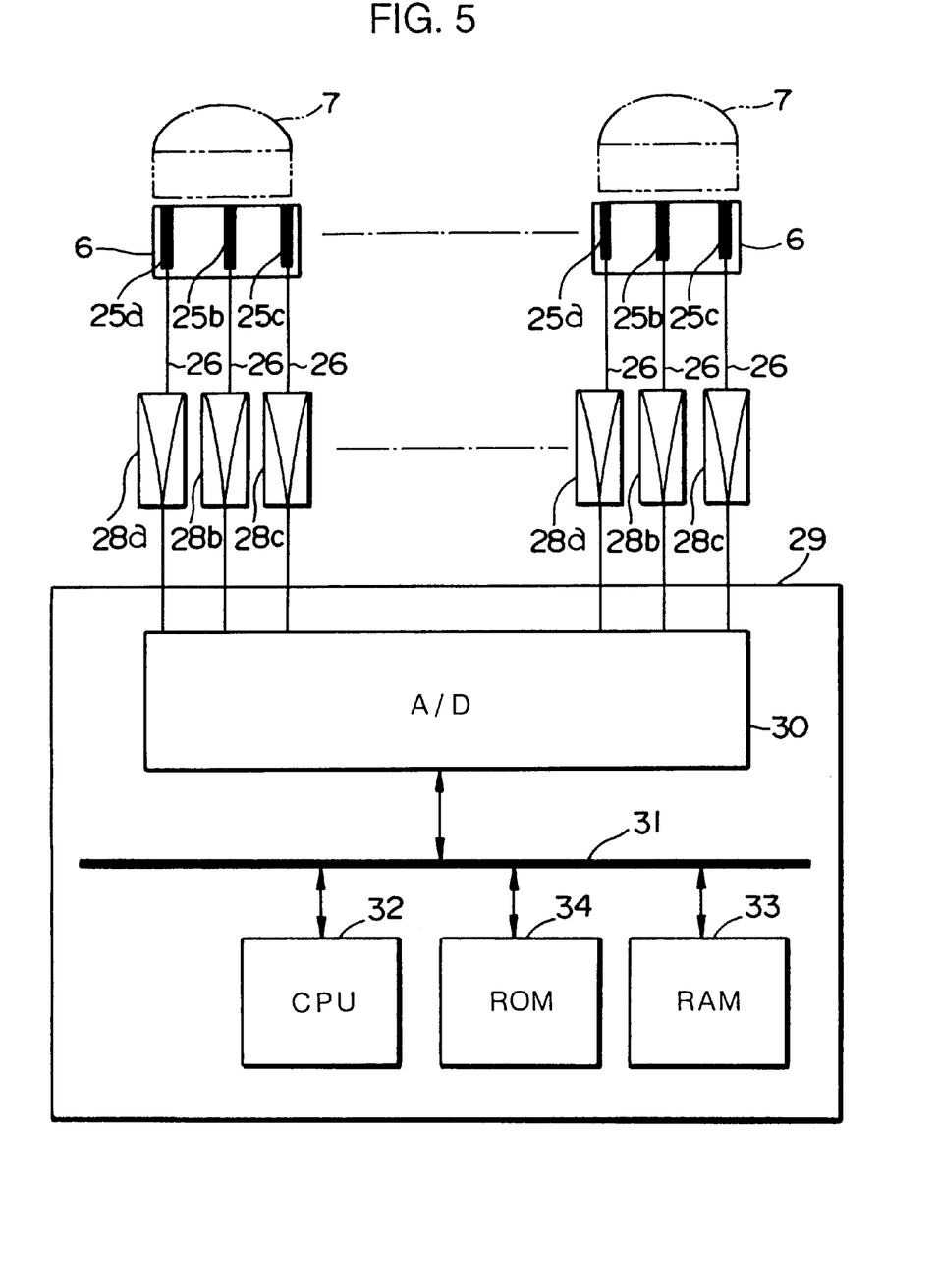
FIG. 5 is a block diagram of a system including the tactile sensor device incorporated in the finger mechanism shown in FIG. 1.

As shown in FIG. 5, the leads 26 electrically connected to the respective gap sensors 25a, 25b, 25c and extending out of the base bodies 6 of the respective finger mechanisms of the robot hand are electrically connected to respective amplifiers 28a, 28b, 28c, whose output terminals are connected to a microcomputer 29.

The microcomputer 29 comprises an A/D (analog-to-digital) converter 30 for converting signals amplified by the amplifiers 28a, 28b, 28c into digital signals, a CPU (central processing unit) 32 connected to a bus 31, a RAM (random-access memory) 33, and a ROM (read-only memory) 34 which are connected to the bus 31. The CPU 32 processes the signals supplied from the gap sensors 25a, 25b, 25c through the A/D converter 30 according to given processing formulas and a program stored in the RAM 33 and the ROM 34 for thereby determining the magnitude and direction of a force of contact between the contact member 7 of each finger mechanism and the workpiece W when the contact member 7 contacts the workpiece W.

Operation of the tactile sensor device will be described below.

When the tip end (contact member 7) of the distal phalanx member 5 of each of the finger mechanisms of the robot hand grips the workpiece W, the contact member 7 is subjected to a force applied from the workpiece W that is positioned laterally of the contact member 7. At this time, the contact member 7 is swung about the center of the thin leaf spring 8 and/or axially moved with respect to the base body 6 due to elastic deformation (flexing) of the thin leaf spring 8. The gap 8 between the base body 6 and the conductive plate 7 is now reduced or expanded depending on the magnitude and direction of the force which is applied to the contact member 7 by the workpiece W. As the gap 8 is reduced or expanded, the gap sensors 25a, 25b, 25c generate signals representative of distances between the conductive plate 21 and the tip ends of the gap sensors 25a, 25b, 25c. The signals generated by the gap sensors 25a, 25b, 25c are amplified by the respective amplifiers 28a, 28b, 28c, and supplied to the microcomputer 29. The signals supplied to the microcomputer 29 are converted by the A/D converter 30 into digital signals, which are supplied through the bus 31 to the CPU 32.

The CPU 32 determines the distances between the conductive plate 21 and the tip ends of the gap sensors 25a, 25b, 25c based on the supplied digital signals, and then calculates the magnitude and direction of the force applied to the contact member 7 from the workpiece W using the determined distances.

Figure 6A:
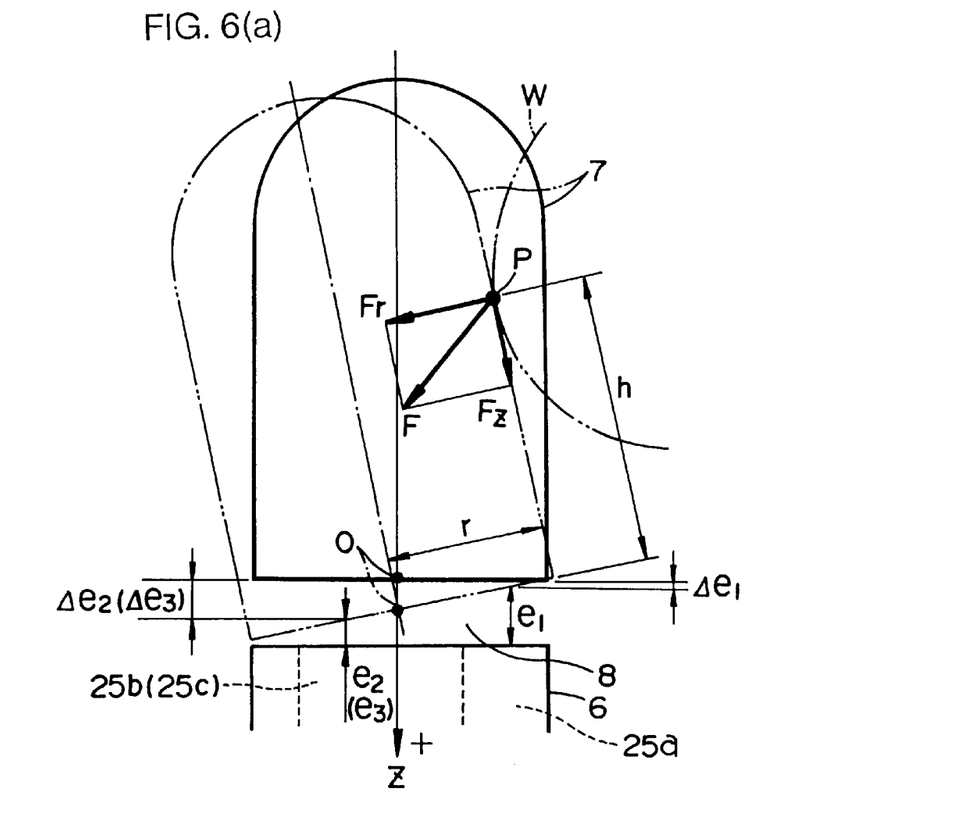
FIGS. 6(a) and 6(b) are schematic views illustrative of the manner in which the tactile sensor device incorporated in the finger mechanism shown in FIG. 1 operates.
Figure 6B:
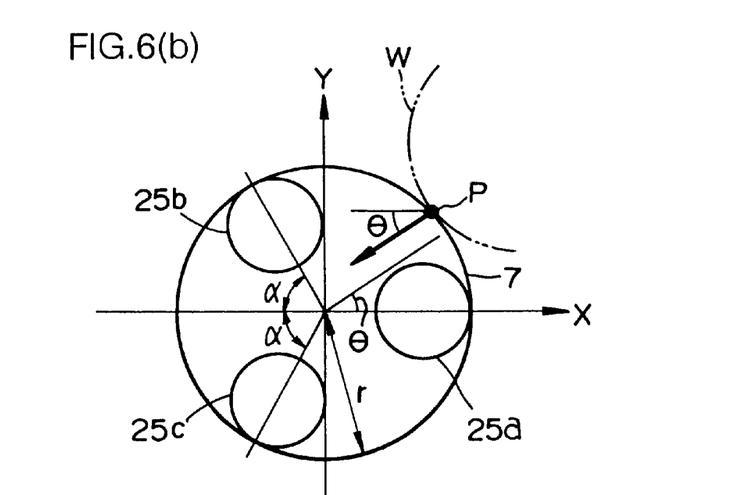

A process of calculating the magnitude and direction of the force applied to the contact member 7 from the workpiece W will be described below with reference to FIGS. 6(a) and 6(b). In FIGS. 6(a) and 6(b), the contact member 7, the base body 6, and other parts are schematically illustrated for the sake of brevity.

In FIG. 6(a), it is assumed that a force applied to the contact member 7 by the workpiece W is represented by F, a component of the force F in the axial direction (a Z-axis direction) of the contact member 7 (hereinafter referred to as an "axial component") by Fz, and a component of the force F in the radial direction (a direction perpendicular to the axial direction) of the contact member 7 (hereinafter referred to as a "radial component") by Fr. It is also assumed that the distance from the end of the contact member 7 close to the base body 6 to a point P where the force F acts (a point where the contact member 7 contacts the workpiece W) is represented by h, the distance between the point P and the axis of the contact member 7 (the radius of the contact member 7) by r, the distances between the contact member 7 and the base body 6 across the gap 8 respectively at the gap sensors 25a, 25b, 25c by $e_1$, $e_2$, $e_3$, respectively, and changes in the distances $e_1$, $e_2$, $e_3$ from their values under a normal condition (when the workpiece W does not contact the contact member 7) by $\Delta e_1$, $\Delta e_2$, $\Delta e_3$, respectively. Under the normal condition, the distances $e_1$, $e_2$, $e_3$ satisfy the relationship: $e_1 = e_2 = e_3$.

In FIG. 6(b), the gap sensors 25a, 25a, 25c are positioned in an X-Y coordinate system such that the gap sensor 25a, for example, is positioned on an X-axis, the other gap sensors 25b, 25c are angularly spaced from the X-axis by an angle $\alpha$ (=60° in this embodiment), and the radial component Fr of the force F is directed at an angle $\theta$ with respect to the X-axis.

In view of the fact that the contact member 7 is angularly moved a sufficiently small amount, the changes $\Delta e_1$, $\Delta e_2$, $\Delta e_3$ (detected on the basis of output signals from the gap sensors 25a, 25b, 25c) that occur in the respective distances $e_1$, $e_2$, $e_3$ under the force applied to the contact member 7 are expressed by the following equations (1)~(3):

$$\Delta e_1 = \frac{Fz}{Kz} - \frac{M\theta}{K\theta}\cos\theta \quad (1)$$

$$\Delta e_2 = \frac{Fz}{Kz} + \frac{M\theta}{K\theta}\cos(\alpha + \theta) \quad (2)$$

$$\Delta e_3 = \frac{Fz}{Kz} - \frac{M\theta}{K\theta}\cos(\alpha - \theta) \quad (3)$$

where $M\theta$ represents a moment (=Fr.h−Fz.r) about a point about which the contact member 7 is angularly moved by the force F (the center of the thin leaf spring 9, which is indicated by O in FIG. 6(a)), Kz represents a spring constant in the axial direction of the thin leaf spring 9, and $K\theta$ represents a spring constant of the thin leaf spring 9 in the direction in which the contact member 7 is angularly moved about the point O.

Since $\alpha=60°$, the above equations (1)~(3) are expressed by the following respective equations (4)~(6):

$$\Delta e_1 = \frac{Fz}{Kz} - \frac{M\theta}{K\theta}\cos\theta \quad (4)$$

$$\Delta e_2 = \frac{Fz}{Kz} + \frac{M\theta}{K\theta}\left(\frac{1}{2}\cos\theta - \frac{\sqrt{3}}{2}\sin\theta\right) \quad (5)$$

$$\Delta e_3 = \frac{Fz}{Kz} + \frac{M\theta}{K\theta}\left(\frac{1}{2}\cos\theta + \frac{\sqrt{3}}{2}\sin\theta\right) \quad (6)$$

By adding both sides of the equations (4)~(6), the moment $M\theta$ is eliminated, and the following equation (7) is obtained:

$$\Delta e_1 + \Delta e_2 + \Delta e_3 = \frac{3Fz}{Kz} \therefore Fz = Kz\frac{\Delta e_1 + \Delta e_2 + \Delta e_3}{3} \quad (7)$$

Using the equation (7), it is possible to determine the axial component Fz of the force F from the changes $\Delta e_1$, $\Delta e_2$, $\Delta e_3$ (detected on the basis of output signals from the gap sensors 25a, 25b, 25c) that occur in the respective distances $e_1$, $e_2$, $e_3$.

By subtracting both sides of the equations (5), (7) one from the other, the following equation (8) is obtained:

$$\Delta e_3 - \Delta e_2 = \frac{M\theta}{K\theta}\sqrt{3}\sin\theta \quad (8)$$

By substituting the equation (7) in the equation (4), the following equation (9) is obtained:

$$\frac{\Delta e_2 + \Delta e_3 - 2\Delta e_1}{3} = \frac{M\theta}{K\theta}\cos\theta \quad (9)$$

By dividing both sides of the equation (8) by both sides of the equation (9), the following equation (10) is obtained:

$$\frac{\sin\theta}{\cos\theta} = \tan\theta = \frac{\sqrt{3}(\Delta e_3 - \Delta e_2)}{\Delta e_2 + \Delta e_3 - 2\Delta e_1} \quad (10)$$

-continued $$\therefore \theta = \tan^{-1}\left[\frac{\sqrt{3}\,(\Delta e_3 - \Delta e_2)}{\Delta e_2 + \Delta e_3 - 2\Delta e_1}\right]$$

Using the equation (10), it is possible to determine the angle θ (see FIG. 6(b)) indicative of the direction of the force F (the direction of the force F substantially perpendicular to the direction across the gap 8) from the changes $\Delta e_1$, $\Delta e_2$, $\Delta e_3$ (detected on the basis of output signals from the gap sensors 25a, 25b, 25c) that occur in the respective distances $e_1$, $e_2$, $e_3$.

Since Mθ=Fr.h−Fz.r, it is placed in the equation (9), providing the following equation (11):

$$Fr = \frac{r}{h}Fz + \frac{M\theta}{h} \quad (11)$$

$$= \frac{r}{h}Fz + \frac{1}{h}\cdot\frac{K\theta}{\cos\theta}\left(\frac{\Delta e_2 + \Delta e_3 - 2\Delta e_1}{3}\right)$$

Using the equation (11), it is possible to determine the radial component Fr of the force F from the changes $\Delta e_1$, $\Delta e_2$, $\Delta e_3$ (detected on the basis of output signals from the gap sensors 25a, 25b, 25c) that occur in the respective distances $e_1$, $e_2$, $e_3$.

The CPU 32 of the microcomputer 29 calculates the equations (7), (10), (11) based on the changes $\Delta e_1$, $\Delta e_2$, $\Delta e_3$ (detected on the basis of output signals from the gap sensors 25a, 25b, 25c) that occur in the respective distances $e_1$, $e_2$, $e_3$, for thereby determining the magnitudes of the components Fz, Fr of the force F which is applied to the contact member 7 by the workpiece W when the contact member 7 contacts the workpiece W, and also the angle θ indicative of the direction of the force F. Then, the magnitudes of the components Fz, Fr of the force F and the angle θ indicative of the direction of the force F, thus determined, are used to adjust the force with and the position in which the workpiece W is gripped by the robot hand. The constants Kz, Kθ, r, h used for the calculations of the equations (7), (10), (11) are stored beforehand in the RAM 33 and the ROM 34 of the microcomputer 29.

The tactile sensor device according to the present embodiment can therefore detect the magnitude and direction of the force F indicative of how the contact member 7 contacts the workpiece W at each of the finger mechanisms of the robot hand, with a relatively simple and inexpensive structure which employs the thin leaf spring 9 and the eddy-current gap sensors 25a, 25b, 25c. Since the eddy-current gap sensors 25a, 25b, 25c are not easily susceptible to temperature changes and noise, the tactile sensor device is capable of stably detecting the magnitude and direction of the force F, allowing the robot hand to grip the workpiece W stably.

In the above embodiment, the central region of the thin leaf spring 9 is fixed to the base body 6, and the outer circumferential edge of the thin leaf spring 9 is fixed to the contact member 7. However, the central region of the thin leaf spring 9 may be fixed to the contact member 7, and the outer circumferential edge of the thin leaf spring 9 may be fixed to the base body 6.

In the above embodiment, the three gap sensors 25a, 25b, 25c are used in each of the finger mechanisms for detecting the magnitude and direction of the force F. However, two gap sensors may be used in each of the finger mechanisms for detecting only a certain component of the force F or only the direction of the force F.

Figure 7:
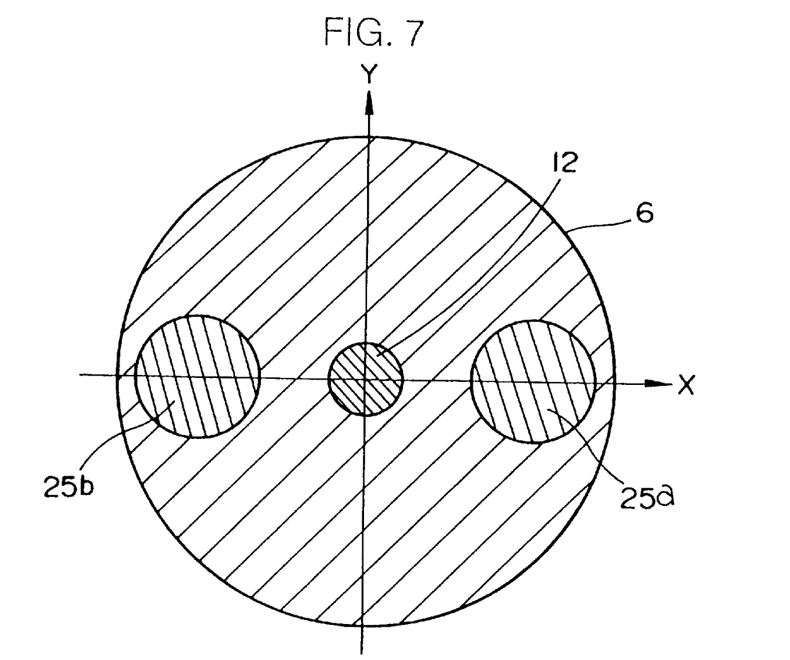
FIG. 7 is a transverse cross-sectional view of a tactile sensor device according to another embodiment of the present invention.

FIG. 7 shows a tactile sensor device according to another embodiment of the present invention, which employs two gap sensors. As shown in FIG. 7, two gap sensors 25a, 25b are inserted and fixed in the base body 6 at respective positions that are angularly spaced from each other by 180°. Other structural details including the contact member 7 and the thin leaf spring 9 are identical to those shown in FIG. 2. With the tactile sensor device shown in FIG. 7, changes $\Delta e_1$, $\Delta e_2$ (detected on the basis of output signals from the gap sensors 25a, 25b) in the distances $e_1$, $e_2$ from their values ($e_1 = e_2$) in the normal condition between the contact member 7 and the base body 6 across the gap 8 at the respective gap sensors 25a, 25b are expressed by the following equations (12), (13), which are obtained by substituting Δ=0 in the equations (1), (2):

$$\Delta e_1 = \frac{Fz}{Kz} - \frac{M\theta}{K\theta}\cos\theta \quad (12)$$

$$\Delta e_2 = \frac{Fz}{Kz} + \frac{M\theta}{K\theta}\cos\theta \quad (13)$$

By adding both sides of the equations (12), (13), the following equation (14) is obtained:

$$Fz = Kz\frac{\Delta e_1 + \Delta e_2}{2} \quad (14)$$

Using the equation (14), it is possible to determine the axial component Fz of the force F from the changes $\Delta e_1$, $\Delta e_2$ (detected on the basis of output signals from the gap sensors 25a, 25b) in the distances $e_1$, $e_2$ across the gap 8.

Figure 8:
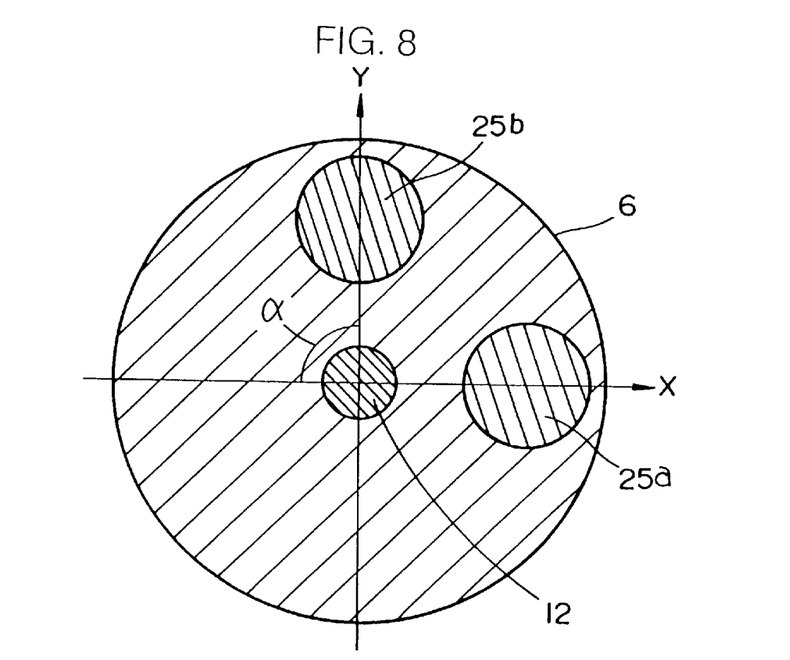
FIG. 8 is a transverse cross-sectional view of a tactile sensor device according to still another embodiment of the present invention.

FIG. 8 shows a tactile sensor device according to still another embodiment of the present invention. As shown in FIG. 8, two gap sensors 25a, 25b are inserted and fixed in the base body 6 at respective positions that are angularly spaced from each other by 90°. Other structural details including the contact member 7 and the thin leaf spring 9 are identical to those shown in FIG. 2. With the tactile sensor device shown in FIG. 8, changes $\Delta e_1$, $\Delta e_2$ (detected on the basis of output signals from the gap sensors 25a, 25b) in the distances $e_1$, $e_2$ from their values ($e_1 = e_2$) in the normal condition between the contact member 7 and the base body 6 across the gap 8 at the respective gap sensors 25a, 25b are expressed by the following equations (15), (16), which are obtained by substituting α=90° in the equations (1), (2):

$$\Delta e_1 = \frac{Fz}{Kz} - \frac{M\theta}{K\theta}\cos\theta \quad (15)$$

$$\Delta e_2 = \frac{Fz}{Kz} - \frac{M\theta}{K\theta}\sin\theta \quad (16)$$

If the force F acts only radially on the contact member 7, i.e., if Fz=0, then Fz=0 is substituted in the equations (15), (16), and both sides of the equation (16) are divided by both sides of the equation (15), providing the following equation (17):

$$\tan\theta = \frac{\Delta e_2}{\Delta e_1} \quad (Fz = 0) \quad (17)$$

-continued $$\therefore \theta = \tan^{-1}\left(\frac{\Delta e_2}{\Delta e_1}\right)$$

Therefore, in the case where the workpiece W contacts the contact member 7 in the radial direction thereof, it is possible to determine the angle θ indicative of the direction of the force F (the direction of the force F substantially perpendicular to the direction across the gap 8) from the changes $\Delta e_1$, $\Delta e_2$ (detected on the basis of output signals from the gap sensors 25a, 25b) in the respective distances $e_1$, $e_2$ across the gap 8.

In the above embodiments, the magnitude and direction of the force acting on the contact member 7 when the contact member 7 contacts the workpiece W are determined. If the presence or absence of contact between the contact member 7 and the workpiece W is detected, then only one gap sensor may be used.

Figure 9:
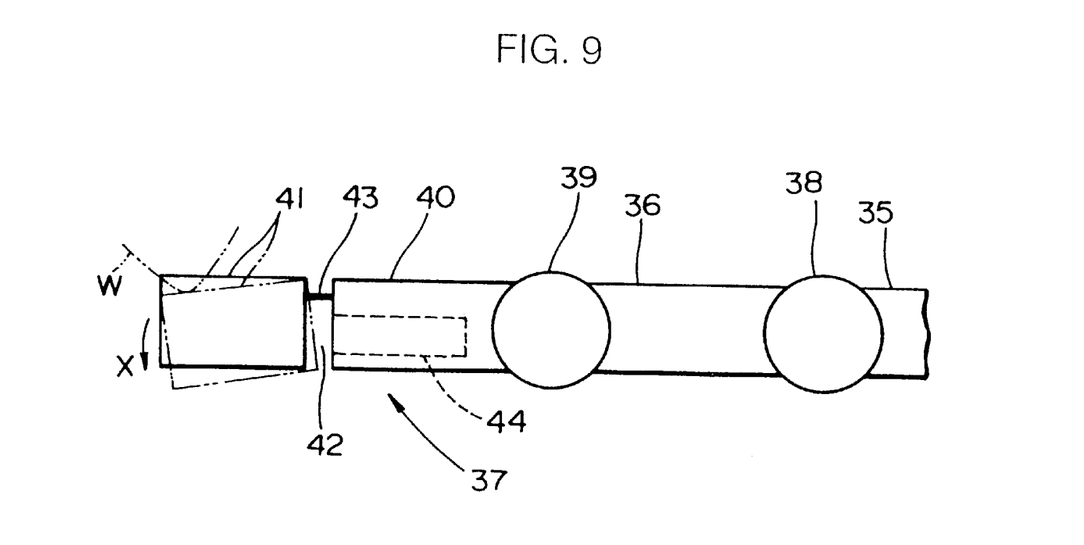
FIG. 9 is a side elevational view of a finger mechanism of a robot hand which incorporates therein a tactile sensor device according to yet still another embodiment of the present invention.

Specifically, FIG. 9 shows a finger mechanism of a robot hand which incorporates therein a tactile sensor device according to yet still another embodiment of the present invention. As shown in FIG. 9, the finger mechanism comprises a proximal phalanx member 35, a middle phalanx member 36, and a distal phalanx member 37 which are angularly movably coupled by first and second joints 38, 39. The distal phalanx member 37 comprises a base body 40 positioned close to the middle phalanx member 36 and a contact member 41 positioned at a tip end for contacting the workpiece W, with a gap 42 left between the base body 40 and the contact member 41. The base body 40 and the contact member 41 are operatively connected to each other by a thin leaf spring 43 of a square shape, for example, disposed in the gap 42 parallel to the axes of the base body 40 and the contact member 41. A gap sensor 44, which is identical to each of the gap sensors 25a~25c, is disposed in an axial region, for example, of the base body 40 in confronting relationship to an end face of the contact member 41 which faces the base body 40.

When the workpiece W is brought into contact with the contact member 41 as shown in FIG. 9, the contact member 41 is angularly moved as indicated by the arrow x due to flexing of the thin leaf spring 43, bringing about a change in the distance between the contact member 41 and the gap sensor 44 across the gap 42. The change in the distance is detected by the gap sensor 44 thereby to detect the contact between the workpiece W and the contact member 41. In this manner, the tactile sensor device shown in FIG. 9 is capable of detecting whether the contact member 41 is contacted by the workpiece W or not.

In the above embodiments, each of the gap sensors comprises an eddy-current displacement gap sensor. However, each of the gap sensors may comprise a known laser-beam displacement gap sensor. The laser-beam gap sensor may be mounted in the base body, and emit a laser beam to the end face of the contact member which faces the base body for detecting a distance between the contact member and the base body at the laser-beam gap sensor across the gap.

Alternatively, each of the gap sensors may comprise an electrostatic capacitance displacement gap sensor. The electrostatic capacitance gap sensor may be mounted in the base body, and detect an electrostatic capacitance between the contact member and the base body at the electrostatic capacitance gap sensor across the gap for detecting a distance between the contact member and the base body.

Further alternatively, an air flow may be generated in the gap between the contact member and the base body, and a change which occurs in the air pressure when the contact member is angularly or axially moved with respect to the base body may be detected to detect a change in the distance between the contact member and the base body.

In each of the above embodiments, the tactile sensor device is incorporated in each of the finger mechanisms of the robot hand. However, the principles of the present invention are applicable to the detection of a state of contact between various contact members and a workpiece or object.

Although certain preferred embodiments of the present invention have been shown and described in detail, it should be understood that various changes and modifications may be made therein without departing from the scope of the appended claims.

What is claimed is:

1. A tactile sensor device for detecting a state of contact with a workpiece, comprising:

a base body;

a contact member spaced from said base body by a gap, for contacting the workpiece;

a restorable resilient member, said contact member being supported on said base body by said restorable resilient member for angular movement with respect to said base body and/or movement across said gap to cause a change in a distance between said contact member and said base body across said gap when said contact member is contacted by the workpiece;

a gap sensor for generating a signal in proportion to the distance between said contact member and said base body across said gap at a predetermined region, a calculating means to calculate factors representing the contacting state of said contact member, depending on said signal, and a cover covering said gap.

2. A tactile sensor device according to claim 1, wherein said restorable resilient member comprises a thin leaf spring interposed between said base body and said contact member substantially perpendicularly to a direction across said gap, said thin leaf spring having a substantially central region fixed to either one of said contact member and said base body and an outer peripheral edge fixed to the other one of said contact member and said base body.

3. A tactile sensor device according to claim 2, wherein said thin leaf spring has a slot for assisting said thin leaf spring in being elastically deformable.

4. A tactile sensor device for detecting a state of contact with a workpiece, comprising:

a base body:

a contact member spaced from said base body by a gap, for contacting the workpiece:

a restorable resilient member, said contact member being supported on said base body by said restorable resilient member for angular movement with respect to said base body and/or movement across said gap to cause a change in a distance between said contact member and said base body across said gap when said contact member is contacted by the workpiece:

a gap sensor for generating a signal in proportion to the distance between said contact member and said base body across said gap at a predetermined region, and a calculating means to calculate factors representing the contacting state of said contact member, depending on said signal, wherein said restorable resilient member supports said contact body on said base body for angular movement with respect to said base body and movement across said gap and substantially against movement substantially perpendicularly to a direction across said gap and angular movement about an axis across said gap, said gap sensor comprising at least three gap sensors for detecting distances between said base body and said contact member across said gap at at least three different regions, further comprising force detecting means for detecting the magnitude and direction of a force acting on said contact member when said contact member is contacted by said workpiece, based on the distances across said gap at said different regions as detected by signals from said gap sensors.

5. A tactile sensor device according to claim 4, wherein said gap sensor comprises three gap sensors, said at least three different regions comprise three regions angularly spaced around said axis at equal angular intervals, said force detecting means comprising means for detecting the magnitude of a component of said force across said gap, the magnitude of a component of said force substantially perpendicularly to the direction across said gap, and a direction of said force substantially perpendicularly to the direction across said gap, based on the distances across said gap at said three regions as detected by signals from said three gap sensors.

6. A tactile sensor device for detecting a state of contact with a workpiece, comprising:

a base body:

a contact member spaced from said base body by a gap, for contacting the workpiece:

a restorable resilient member, said contact member being supported on said base body by said restorable resilient member for angular movement with respect to said base body and/or movement across said gap to cause a change in a distance between said contact member and said base body across said gap when said contact member is contacted by the workpiece:

a gap sensor for generating a signal in proportion to the distance between said contact member and said base body across said gap at a predetermined region, and a calculating means to calculate factors representing the contacting state of said contact member, depending on said signal, wherein said restorable resilient member supports said contact body on said base body for angular movement with respect to said base body and movement across said gap and substantially against movement substantially perpendicularly to a direction across said gap and angular movement about an axis across said gap, said gap sensor comprising two gap sensors for detecting distances between said base body and said contact member across said gap at two different regions, further comprising force detecting means for detecting a component in a predetermined direction of a force acting on said contact member when said contact member is contacted by said workpiece or a direction of said force, based on the distances across said gap at said two different regions as detected by signals from said two gap sensors.

7. A tactile sensor device according to claim 6, wherein said two regions are angularly spaced around said axis at a 180° interval, and said force detecting means comprises means for detecting the magnitude of the component of the force across said gap based on the distances across said gap at said two different regions as detected by signals from said two gap sensors.

8. A tactile sensor device according to claim 6, wherein said two regions are angularly spaced around said axis at a 90° interval, and said force detecting means comprises means for detecting the direction of the force substantially perpendicular to the direction across said gap based on the distances across said gap at said two different regions as detected by signals from said two gap sensors.

9. A tactile sensor device according to claim 1, wherein said state of contact detected between said contact member and the workpiece on the basis of the distance across said gap as detected by the signal generated by said gap sensor is indicative of whether said contact member is contacted by the workpiece or not.

10. A tactile sensor device for detecting a state of contact with a workpiece, comprising:

a base body:

a contact member spaced from said base body by a gap, for contacting the workpiece:

a restorable resilient member, said contact member being supported on said base body by said restorable resilient member for angular movement with respect to said base body and/or movement across said gap to cause a change in a distance between said contact member and said base body across said gap when said contact member is contacted by the workpiece;

a gap sensor for generating a signal in proportion to the distance between said contact member and said base body across said gap at a predetermined region, and a calculating means to calculate factors representing the contacting state of said contact member, depending on said signal, wherein said gap sensor comprises an eddy-current displacement sensor, a laser-beam displacement sensor, or an electrostatic capacitance displacement sensor.

* * * * *